United States Patent [19]
Stottlemyer

[11] 3,821,864
[45] July 2, 1974

[54] VEGETATIVE REPRODUCTION OF GRASSES

[75] Inventor: William E. Stottlemyer, Ostrander, Ohio

[73] Assignee: O. M. Scott & Sons Company, Marysville, Ohio

[22] Filed: Apr. 6, 1973

[21] Appl. No.: 348,721

[52] U.S. Cl.............................. 47/58, 111/2, 71/86
[51] Int. Cl................................................ A01n 5/00
[58] Field of Search........................... 71/86; 47/58 111/1–3;DIG. 1

[56] References Cited
UNITED STATES PATENTS
3,551,528  12/1970  Randall.............................. 71/86 X
3,728,381  4/1973  Randall et al...................... 71/86 X FOREIGN PATENTS OR APPLICATIONS
803,947  1/1969  Canada OTHER PUBLICATIONS
Induction of Male Sterility in Wheat – – – , Rowell et al., Crop Science, Sept.–Oct. 1971, pp. 629–631.

*Primary Examiner*—Robert E. Bagwill
*Attorney, Agent, or Firm*—James B. Raden; Harold J. Holt

[57] ABSTRACT

Grasses of the non-stoloniferous type are vegetatively reproduced by treating the grasses with a growth regulator which produces aerial nodes in the stems thereof by internode elongation in the crown of the grasses. At least one of the aerial nodes are clipped from the stem and this clipping is sprigged into soil. The nodes on this clipping will root and produce tillers. In most instances, the nodes in the crown of the parent plant will produce tillers after removal of the clipping and thus the parent plant will also survive.

15 Claims, No Drawings

VEGETATIVE REPRODUCTION OF GRASSES

This invention relates to a process for vegetative reproduction of grasses by sprigging.

It would be desirable to establish bluegrass, and particularly Kentucky bluegrass (Poa pratensis), lawns by a process other than seeding or sodding. Seeding is an inexpensive but normally slow process, usually requiring from 9 to 12 months to produce a well established lawn. Sodding on the other hand, produces an instant lawn but is relatively costly.

Certain grasses can also be reproduced by sprigging but this has only been possible with stolon-producing grasses such as bermudagrass, bentgrass, and St. Augustine grass. It has not hitherto been considered possible to reproduce nonstoloniferous grasses such as Kentucky bluegrass by sprigging. Kentucky bluegrasses have been reproduced vegetatively by using sod plugs or pieces of shredded sod. However, this requires use of a major portion of the plant and there is little remaining parent to regenerate the original sod.

A number of compounds are known which stimulate, increase the yield of, or in some cases, inhibit the growth of grasses. Certain of such growth regulators, or growth modifiers, including 2-chloroethylphosphonic acid and gibberellic acid are also known to stimulate the elongation of the internodes in the crown of vegetative Kentucky bluegrass plants. However, in so far as is known, it has never previously been suggested that such growth regulators may be utilized for the vegetative reproduction of grasses.

A normal bluegrass plant produces a stem only when it has been induced into the reproductive phase. This reproductive stem which is called a culm will have three to five nodes which will not root when sprigged into soil. Although 2-chloroethylphosphonic acid and gibberellic acid are known to stimulate the elongation of the internodes in the crown of vegetative Kentucky bluegrass plants, the significance of the stimulation of aerial stem formation has not previously been recognized and has in fact been considered a disadvantage. Nor has it previously been suggested that Kentucky bluegrass can be vegetatively reproduced by using only the aerial portion of the plant.

It has now been discovered that grasses of the non-stoloniferous type may be vegetatively reproduced by sprigging following treatment with a growth regulator which stimulates the formation of aerial nodes in the stems by internode elongation in the crown of the grasses. The process of the present invention involves the treatment of such grasses with such a growth regulator, clipping at least one of the nodes from the stems and sprigging the clipping into soil or other growing medium. The clippings will thereafter root and produce tillers. Since in most instances the nodes in the crown of the parent plant are also capable of producing tillers, the parent plan survives. Thus from a single original plant, two or more plants result.

The invention is particularly adapted to the vegetative reproduction of Kentucky bluegrass. However, it is also applicable to a variety of additional grass species as long as they are capable of stimulation to produce aerial nodes in their vegetative stems. The invention is not applicable to the so-called stolon-producing grasses which are capable of being sprigged without prior treatment. In addition to Kentucky bluegrass, a large number of non-stoloniferous grasses have been found capable of stimulation to produce sprigs without loss of parent material including meadow fescue, tall fescue, perennial ryegrass, sudangrass, bromegrass, timothy and red fescue and, to a lesser extent, bahiagrass or orchardgrass. In addition, sprig production is increased for wheat, oats and hard fescue, although with varying degrees of loss of parent material.

In the process of the present invention, Kentucky bluegrass plants are first treated with an appropriate growth regulator. As used herein, the term growth regulator is intended to refer to materials which stimulate the production of one or more aerial nodes in the stems by internode elongation in the crown of the grasses. Illustrative, but not necessarily limiting examples of such growth regulators, which may be used alone or in combination, are ethylene, 2-chloroethylphosphonic acid and its ethylene producing derivatives, gibberellic acid, 3,6-endoxohexahydrophthalic acid and 1-naphthaleneacetamide. The growth regulator may be used in spray, granular or other formulations, within a wide range of rates. On the one hand, it is necessary to use sufficient growth regulator to stimulate the production of one or more aerial nodes, and this may be achieved with as little as 1 lb/acre of growth regulator. At the other extreme, too great a rate, normally more than about 64 lbs/acre, is phytotoxic and hence destroys the grasses. The most effective rates have been between about 4 and 16 lbs/acre.

The most effective, and therefore the preferred growth regulator in the practice of this invention, is 2-chloroethylphosphonic acid. 2-chloroethylphosphonic acid appears to undergo a chemical decomposition when it enters the plant tissue and gives off ethylene, which acts to stimulate internode elongation of the crown. Esters (e.g. the monochloroethyl ester), amides and anhydrides of 2-chloroethylphosphonic acid also act in a similar fashion to release ethylene and all such ethylene-producing derivatives of 2-chloroethylphosphonic acid are accordingly included within the scope of the invention. 2-chloroethylphosphonic acid is commercially available for regulating plant growth either as the free acid, the ester or as a three way mixture of acid, ester and anhydride, in a propylene glycol or other base under the trademark Ethrel. It is water soluble and is preferably utilized in the practice of the invention in an aqueous solution. It is stable in aqueous solutions below a pH of about 3.5 and can be conveniently maintained at or below this pH level by the addition of an acid such as hydrochloric acid. Normally from 60 to 120 gallons of aqueous Ethrel solution are applied to an acre of turf in concentrations of from about 80 to 135,000 or even more parts of Ethrel per million parts of water.

Following treatment with the growth regulator, the grasses are clipped by mowing or otherwise cutting off a portion of the stem containing at least one of the aerial nodes. The time elapsing between treatment and cutting may vary considerably depending upon the particular variety of grass and upon soil, moisture, temperature and other conditions. In the normal case, cutting may be carried out as soon as one or more aerial nodes are visible in the stem, from several weeks to several months after treatment. The height of the clipping or sprig should be sufficient to include one or more aerial nodes — normally from 1 inch to 4 inches with Kentucky bluegrass.

Sprigging may be done, as in the case of conventional bermudagrass or other southern grasses, by covering the sprig with soil or by planting the sprig in the ground with a portion exposed. Sprigs from an acre of bluegrass will cover an area considerably larger than the area covered by the original bluegrass, from 5, normally 10, to 30 acres. This 1:10 to 1:30 dilution factor will of course considerably reduce the cost/acre of establishing lawns as contrasted to sodding. Within three to five days after sprigging, the sprigs will have rooted in the ground and will be standing upright. Within seven to fourteen days, the sprigs will have grown enough to be mowed for the first time. About two to three months after sprigging, the sprigs will have produced a well established turf.

Both field and greenhouse observations indicate that 2 months after being clipped, the parent material will have regrown so that it can be cut and used as sod or it can be retreated for sprig production. The short period required for reestablishment of the sod also contributes to the economy of the process. Moreover, sprigs are much lighter than sod, so that the cost of harvesting and shipping sprigs will be much less than sod.

The practice of the invention is further illustrated by the following examples:

EXAMPLE 1

This example demonstrates that when Kentucky bluegrass (Poa pratensis) plants are treated with 2-chloroethylphosphonic acid the plants are stimulated to produce stems with nodes which will initiate tillers; that these stems will readily root and develop into vigorous growing plants when cut from the parent plants and sprigged into soil; and that nodes are required for root formation.

Windsor (a variety of Kentucky bluegrass) plants supported by corks were started in a nutrient solution - Hoagland Sol. No. 1 - in 50 ml flasks. Hoagland Sol. No. 1 has the following composition:

| CHEMICAL | mg/liter |
|---|---|
| $KH_2PO_4$ | 136.1 |
| $KNO_3$ | 505.5 |
| $Ca(NO_3)_2 \cdot 4H_2O$ | 1180.8 |
| $MgSO_4 \cdot 7H_2O$ | 493.0 |
| Iron as Sequestrene Na Fe (13%) | 5.0 |
| $H_3BO_3$ | 2.86 |
| $MnCl_2 \cdot 4H_2O$ | 1.81 |
| $ZnSO_4 \cdot 7H_2O$ | 0.22 |
| $CuSO_4 \cdot 5H_2O$ | 0.08 |
| $H_2MoO_4 \cdot H_2O$ | 0.02 |

The plants were grown in a growth chamber set at 30°C with continuous light. After the plants had become established, they were treated with 0.0, 0.4, 4.0, 40, and 400 ppm Ethrel solutions by adding 50 ml of Ethrel solution to each flask. The Ethrel solutions were made up from a free acid formulation containing 2 lb. of 2-chloroethylphosphonic acid/gallon (propylene glycol base). One week after treatment with Ethrel and every week thereafter the plants were given 10 ml of Hoagland's solution and distilled water as needed. The plants were clipped at a height of 2 inches 4 days, 3 weeks and 6 weeks after Ethrel treatment.

Six weeks after the Ethrel treatment the following observations were made:

0.4 ppm — Some of the plants had a stem with one or more nodes and some of the nodes had tillers.

4.0 ppm — All of the plants had a stem with two or more nodes and several of these nodes had tillers.

40 ppm — All of the plants had a stem with two or more nodes and some of the stems had one to three tillers.

400 ppm — All of the plants had stems with bract-like leaves and with a tremendous number of tillers emerging from the crown of the plant. These tillers also had stems with bract-like leaves.

To test whether the aerial nodes would root, the fol-

TABLE I

| Treatment | Plant Material Sprigged | 10 days | Sprig Growth After 22 days |
|---|---|---|---|
| Control | Stem without a node | no roots | no roots |
|  | Stem without a node | no roots | no roots |
|  | Stem with a node | no roots | two well developed roots |
|  | Stem with a node | no roots | a root initial |
| 0.4 ppm Ethrel | Stem with nodes | roots | excellent root system and a vigorous growing plant |
|  | Stem with nodes | no roots | well developed root system |
| 4.0 ppm Ethrel | Stem with nodes | roots | well developed root system and a vigorous growing plant |
|  | Stem with nodes | roots | well developed root system and a vigorous growing plant |
| 40 ppm Ethrel | Stem with nodes | roots from 2 nodes | excellent root system and a vigorous growing plant |
|  | Stem with nodes | roots | well developed root system and a strong growing plant |
| 400 ppm Ethrel | a plant with several tillers | very few very short roots | root system had not developed and the aerial stems were almost dead | lowing plant material was sprigged into soil. For the control plants, two stems were cut which had no nodes and two stems were cut with nodes. In order to get the two stems with nodes, it was necessary to cut the stems below the top of the cork. For the 0.4, 4.0 and 40 ppm Ethrel-treated plants, the stems were cut at the top of the cork and all of the stems had nodes. For the 400 ppm Ethrel-treated plants, a plant with several tillers was sprigged into soil. The results of this sprigging experiment are given in Table I.

Ethrel treatment the plants were clipped at a height of either one-half or 1 inch. All of the stems cut from one jar were sprigged into soil in a small plastic flat 6¼ × 8¼ × 2½ inches. The sprigged plants were grown in a greenhouse set at 15.6°C night and 26.7°C day. The parent plants in the jars were clipped at a height of one inch 16 days after sprigging the cut stems. Both the number of stems cut and the fresh weight of the clippings are given in Table II. The sprigged plant material was clipped at a height of one inch 23 days and 39 days

TABLE II

| Treatment | Height of Cut for Sprigs (in) | No. Stems Sprigged | Growth of Plant Material | | | |
|---|---|---|---|---|---|---|
| | | | Parent Plants after 16 days | | Sprigged Plants | |
| | | | No. Stem Cut | Fresh Weight (g) | After 23 days Fresh Weight (g) | After 39 days Fresh Weight (g) |
| Control | 0.5 | 23 | 23 | 0.94 | no growth | no growth |
| Control | 1.0 | 11 | 21 | 1.08 | no growth | no growth |
| Ethrel 10 ppm | 0.5 | 13 | 18 | 0.71 | 1.77 | 1.96 |
| Ethrel 10 ppm | 1.0 | 16 | 20 | 0.78 | 0.35 | 0.47 |
| Ethrel 20 ppm | 0.5 | 19 | 29 | 0.65 | 2.82 | 3.00 |
| Ethrel 20 ppm | 1.0 | 15 | 39 | 1.40 | 0.44 | 0.68 |
| Ethrel 40 ppm | 0.5 | 29 | 16 | 0.52 | 3.77 | 3.55 |
| Ethrel 40 ppm | 1.0 | 22 | 28 | 0.82 | 2.04 | 2.14 |
| Ethrel 80 ppm | 0.5 | 32 | 15 | 0.38 | 3.90 | 4.02 |
| Ethrel 80 ppm | 1.0 | 22 | 21 | 0.48 | 0.71 | 0.67 |
| Ethrel 160 ppm | 0.5 | 21 | 15 | 0.10 | 1.53 | 2.60 |
| Ethrel 160 ppm | 1.0 | 23 | 7 | 0.07 | 1.06 | 1.68 |

The foregoing table shows that all of the stems with nodes produced a root whereas the control stems without a node did not produce a root. With the exception of the 400 ppm Ethrel-treated plants, the stems from the Ethrel-treated plants rooted much faster and produced a more vigorous root system than the stems from the non-treated plants. The 400 ppm Ethrel treatment (well above the effect obtained with 64 lbs/acre) was phytotoxic

EXAMPLE 2

This example demonstrates that when Kentucky bluegrass plants are treated with Ethrel and the sprigs are removed, the parent material is able to quickly recover. It also demonstrates that bluegrass plants treated with Ethrel are capable of producing stems with nodes which are over one inch above the original crown.

Into a two ounce jar containing 50 ml of Hoagland's solution was placed on a three-holed cork with six Windsor bluegrass plants. The plants were grown in a growth chamber set at 10°C nights and 21.1°C days with a 12 hour day. After the plants had become established, they were treated with 0, 10, 20, 40, 80 and 160 ppm Ethrel solution by adding 50 ml of the desired solution to each jar. One week after treatment and every week thereafter the plants were given 20 ml of Hoagland's solution and distilled water as needed. The plants were clipped at a height of two inches one week and three weeks after Ethrel treatment. Sixty days after after sprigging. The fresh weight of the clippings are given in Table II.

The data in Table II show that Kentucky bluegrass can be vegetatively reproduced using only the aerial portion of the plant without losing the parent plant material. Also, the data presented in the example as well as in Example 1 demonstrate that a wide range of concentrations of Ethrel can be used to produce stems with nodes which will root when sprigged into soil.

EXAMPLE 3

This example demonstrates that a wide range of rates of Ethrel can be used to stimulate sprig production of Kentucky bluegrass sod in pots without the loss of parent material.

Plugs of Windsor sod were potted into four inch pots and after becoming well established in the greenhouse, they were treated with 0, 1, 2, 4, 8, 32 and 64 lbs/acre Ethrel. One week after treatment the plants were clipped at a height of 2 inches. Five weeks after treatment the grass was clipped at a height of two inches and then at the soil surface. After recording the number of stems with and without nodes and the number of nodes per stem, 30 stems from each treatment were sprigged into soil. Except for the controls, all of the sprigged stems had nodes. Four weeks after sprigging, the number of surviving sprigs was determined and the parent material was rated for regrowth. Sprigs were counted as surviving if they had roots and were still green.

TABLE III

| Treatment (lbs/acre) | Percent Stems With Nodes | Nodes/Stem | Percent Survival | Regrowth of Parent Material |
|---|---|---|---|---|
| 0 | 0 | 0 | 0 | excellent |
| 1 | 36 | 1–4 | 90 | very good |

TABLE III—Continued

| Treatment (lbs/acre) | Percent Stems With Nodes | Nodes/Stem | Percent Survival | Regrowth of Parent Material |
| --- | --- | --- | --- | --- |
| 2 | 92 | 2–6 | 97 | very good |
| 4 | 95 | 1–6 | 100 | very good |
| 8 | 100 | 2–9 | 90 | very good |
| 16 | 100 | 2–11 | 97 | good |
| 32 | 100 | 2–9 | 90 | good |
| 64 | 100 | 1–10 | 70 | fair |

The above results show that Kentucky bluegrass treated with 1 to 64 lb/acre Ethrel will produce sprigs which will survive when sprigged into soil and that the parent material will have acceptable regrowth.

EXAMPLE 4

This example compares sprigs with seed in establishing new turf.

Two year old Windsor turf that had been fertilized with 1.8 lbs of nitrogen/1000 sq. ft. with Turf Builder (trademark of O. M. Scott and Sons for 23–7–7 fertilizer) in April and in June was treated with 0 (as a control) and 8 lb/acre Ethrel on July 26. Sprigs were cut at the soil surface with an electric hand grass clipper on October 7 and held overnight at 40°F. The next day, the sprigs were sprigged into a well prepared seedbed with the total area sprigged being ten times the area clipped for sprigs. Windsor seed was seeded into a similarly well prepared seedbed for comparison. The three treatments were replicated four times. All plots were fertilized with a 1.8 lbs of nitrogen/1000 sq. ft. using Turf Builder. The plots were irrigated as needed to keep the soil moist.

Four weeks after sprigging, the density (percent coverage) and the height of the plant material were taken. The data for the four plots are given in Table IV. The control sprigs from the untreated turf did not root and hence test results for all four plots were zero. Although the seeded plots had a percent coverage almost as good as the sprigged plots, the height of the seedlings were significantly shorter than the height of the sprigged plants indicating that the sprigged plants were growing faster than the seedlings.

TABLE IV

| Treatment | Density (%) Plot | Density (%) Plot Avg. | Height (in.) Plot | Height (in.) Plot Avg. |
| --- | --- | --- | --- | --- |
| Seed | 40 | | 0.75 | |
| | 50 | | 1.00 | |
| | 50 | | 0.75 | |
| | 45 | 46 | 0.75 | 0.8 |
| Ethrel-treated Sprigs | 50 | | 3.00 | |
| | 55 | | 3.00 | |
| | 55 | | 3.50 | |
| | 55 | 54 | 2.75 | 3.1 |

As a measure of regrowth of the parent material, a percent coverage or density reading was taken 4 weeks after clipping. The density of the Ethrel-treated parent material was 65 percent compared to 85 percent for non-treated parent material demonstrating that Ethrel-treated plant material can be removed for sprigging without killing the parent plants.

On May 19 or 7 months after sprigging, the plots were mowed at a height of 2 inches. The fresh weights of these clippings are given in the table below. The density of the sprigged and seeded plots was taken on June 12 or eight months after sprigging and is given in Table V below. One of the seeded plots had drowned out, so the results of only 3 seeded plots are shown. These data show that after seven months, the sprigged plots had a significantly better rate of growth than the seeded plots.

TABLE V

| Treatment | Fresh Weight (g) Plot | Fresh Weight (g) Plot Avg. | Density (%) Plot | Density (%) Plot Avg. |
| --- | --- | --- | --- | --- |
| Seed | (a) | | (a) | |
| | 54 | | 75 | |
| | 20 | | 45 | |
| | 25 | 33 | 60 | 60 |
| Ethrel-treated Sprigs | 290 | | 78 | |
| | 474 | | 70 | |
| | 426 | | 70 | |
| | 448 | 410 | 80 | 75 |

(a) This plot drowned out.

The density data indicate that after eight months, the sprigged plots had filled in significantly faster than the seeded plots.

EXAMPLE 5

This example demonstrates that when Kentucky bluegrass plants are treated with ethylene, the plants are stimulated to produce stems with nodes and that these stems will readily root and develop into vigorous growing plants when cut from the parent plants and sprigged into soil. It also demonstrates that the parent material will have acceptable regrowth.

Three Windsor plants were placed into a two ounce jar containing 50 ml of Hoagland's solution. The plants were grown in the greenhouse for four months before being treated with ethylene. Before each treatment the jars were filled with distilled water. The plants were treated with ethylene by bubbling the gas through the water at a rate of 5 ml per minute for 0, 1, 4, and 16 minutes a day for five days. Two, five and seven weeks after the first ethylene treatment, the plants were clipped at a height of 2 inches. To each jar was added 20 ml of Hoagland's solution and distilled water as needed two weeks after the first ethylene treatment and once a week thereafter.

After seven weeks, the plants were clipped at the top of the cork, the number of stems were recorded, and then all of the stems were sprigged into soil. Two weeks after sprigging, the parent material was rated for regrowth. Three weeks after sprigging, the number of surviving sprigs was determined. Sprigs were counted as surviving if they had roots and were still green. The results are presented in Table VI.

TABLE VI

| Treatment (ml ethylene) (day) | Nodes Stem | No. of Sprigs Sprigged | No. of Sprigs Survived | Percent Survival | Regrowth of Parent Material |
|---|---|---|---|---|---|
| 0 | 0 | 21 | 0 | 0 | excellent |
| 5 | 1–3 | 26 | 19 | 73 | good |
| 20 | 1–3 | 35 | 15 | 43 | fair |
| 80 | 1–3 | 19 | 15 | 79 | fair |

The data indicate that the ethylene-treated parent plants had acceptable regrowth. However, those treated with 20 and 80 ml of ethylene for 5 days had less regrowth than those treated with 5 ml of ethylene for five days.

For the sprigged plant material, none of the control stems grew. The number of surviving sprigs from the treated plant material was from 15 to 19 sprigs per jar, indicating that all three ethylene treatments stimulated the production of stems with nodes.

EXAMPLE 6

This example illustrates that gibberellic acid will stimulate Kentucky bluegrass plants to produce sprigs. Windsor plants grown in 2 ounce jars were treated as described in Example 2 with the following exceptions. The plants were treated with 0, 10 and 40 ppm Ethrel and 20 ppm gibberellic acid and they were clipped 29, 49 and 77 days after treatment as indicated in Table VII. After 77 days, the plants were clipped at the top of the cork, the number of sprigs recorded, and then all of the sprigs were sprigged into soil. As a measure of the regrowth of the parent material, the number of stems per jar were counted four weeks after sprigging and recorded. Six weeks after sprigging, the sprigged plants were washed out of the soil and the number of surviving sprigs recorded.

The plants treated with gibberellic acid grew so fast that both replicates had to be cut at a height of two inches 29 days after being treated. From the data in Table VII, it can be seen that sprigs cut from plants treated with either gibberellic acid or Ethrel had a good percent survival. Also, although the regrowth of the treated plants was not as good as the control plants, all of the treated parent material did have fair to good regrowth as indicated in the number of stems per jar. Thus these data demonstrate that gibberellic acid can be used to stimulate Kentucky bluegrass to produce sprigs.

EXAMPLE 7

This example demonstrates that grasses other than Kentucky bluegrass (*Poa pratensis*) can be vegetatively reproduced to stimulate internode extension and subsequent nodes capable of rooting when placed in an environment favorable for plant growth.

SPECIES OF GRASSES TESTED

| Common Name | Scientific Name |
|---|---|
| Corn | *Zea mays* |
| Wheat | *Triticum aestivum* |
| Oats | *Avena sativa* |
| Sudangrass | *Sorghum vulgare var. Sudanense* |
| Timothy | *Phleum pratense* |
| Bromegrass | *Bromus inermis* |
| Orchardgrass | *Dactylis glomerata* |
| Creeping Bentgrass | *Agrostis palustris* |
| Hard Fescue | *Festuca ovina var. duriuscula* |
| Red Fescue | *Festuca rubra* |
| Tall Fescue | *Festuca elatior var. arundinacea* |
| Meadow Fescue | *Festuca elatior* |
| Perennial Ryegrass | *Lolium perenne* |
| Bahiagrass | *Paspalum notatum* |

TABLE VII

| Treatment | Replicate | Height of Cut (in) Day 29 | Height of Cut (in) Day 49 | Height of Cut (in) Day 77 | Sprigs Sprigged | Sprigs Survived | Percent Survival | Regrowth of Parent Mat. Stems/jar |
|---|---|---|---|---|---|---|---|---|
| Control | 1 | 2 | 1 | 0 | 28 | 2 | 7 | 26 |
|  | 2 | — | 1 | 0 | 19 | 0 | 0 | 19 |
| Ethrel 10 ppm | 1 | — | 1 | 0 | 32 | 20 | 62 | 14 |
|  | 2 | 2 | 2 | 0 | 23 | 12 | 52 | 16 |
| Ethrel 40 ppm | 1 | — | 1 | 0 | 21 | 9 | 43 | 8 |
|  | 2 | 2 | 2 | 0 | 27 | 22 | 82 | 13 |
| Gibb 20 ppm | 1 | 2 | 1 | 0 | 28 | 11 | 39 | 13 |
|  | 2 | 2 | 2 | 0 | 24 | 15 | 62 | 14 |

The above grasses were seeded into soil on February 24 and allowed to germinate in the greenhouse. On March 17, duplicate pots of seedlings were treated with Ethrel at 0, 5, 10, 20 and 40 lbs/A. From May 1 through May 9 the plants were clipped at the soil surface and sprigged into soil as indicated in the table below. The number of sprigs surviving was determined from May 30 to June 2. Sprigs were counted as surviving if they had roots and were still green. On June 5, the parent material was rated for regrowth. The results are set forth in Table VIII.

TABLE VIII

| Treatment (lbs/A) | Number of Sprigs Sprigged[a] | | Survived | Percent Survival | Regrowth of Parent Material |
|---|---|---|---|---|---|
| | Without Nodes | With Nodes | | | |
| | | MEADOW | FESCUE | | |
| 0 | 30 | | 0 | 0 | excellent |
| 5 | | 30 | 22 | 73 | good |
| 10 | | 30 | 28 | 93 | fair |
| 20 | | 30 | 29 | 97 | very poor |
| 40 | | 30 | 28 | 93 | very poor |
| | | TALL | FESCUE | | |
| 0 | 30 | | 0 | 0 | excellent |
| 5 | | 30 | 30 | 100 | good |
| 10 | | 30 | 30 | 100 | fair |
| 20 | | 30 | 30 | 100 | very poor |
| 40 | | 30 | 30 | 100 | very poor |
| | | PERENNIAL | RYEGRASS | | |
| 0 | 30 | | 0 | 0 | good |
| 5 | 30 | | 0 | 0 | very good |
| 10 | | 18 | 18 | 100 | good |
| 20 | | 5 | 5 | 100 | good |
| 40 | | 24 | 24 | 100 | fair |
| | | SUDANGRASS | | | |
| 0 | 17 | | 0 | 0 | very poor |
| 0 | | 5 | 3 | 60 | |
| 5 | 8 | | 0 | 0 | very poor |
| 5 | | 12 | 7 | 58 | |
| 10 | 6 | | 0 | 0 | very poor |
| 10 | | 13 | 13 | 100 | |
| 20 | 6 | | 0 | 0 | very poor |
| 20 | | 19 | 14 | 74 | |
| 40 | 2 | | 0 | 0 | very poor |
| 40 | | 11 | 7 | 64 | |
| | | ORCHARDGRASS | | | |
| 0 | 30 | | 1[b] | 3 | excellent |
| 0 | | 7 | 4 | 57 | |
| 5 | | 5 | 5 | 100 | excellent |
| 10 | — | — | — | — | excellent |
| 20 | | 3 | 3 | 100 | excellent |
| 40 | | 11 | 8 | 73 | excellent |
| | | BROMEGRASS | | | |
| 0 | 30 | | 2[b] | 7 | excellent |
| 5 | | 30 | 19 | 63 | excellent |
| 10 | | 30 | 28 | 93 | excellent |
| 20 | | 30 | 29 | 97 | very good |
| 40 | | 30 | 27 | 90 | very good |
| | | TIMOTHY | | | |
| 0 | 24 | | 0 | 0 | good |
| 0 | | 3 | 2 | 67 | |
| 5 | 24 | | 1[b] | 4 | fair |
| 5 | | 4 | 4 | 100 | |
| 10 | 12 | | 0 | 0 | none |
| 10 | | 1 | 1 | 100 | |
| 20 | | 15 | 12 | 80 | very poor |
| 40 | | 4 | 4 | 100 | very poor |
| | | WHEAT | | | |
| 0 | 30 | | 0 | 0 | very good |
| 5 | 24 | | 0 | 0 | very poor |
| 5 | | 2 | 2 | 100 | none |
| 10 | 30 | | 0 | 0 | none |
| 20 | | 10 | 10 | 100 | none |
| 40 | | 12 | 12 | 100 | none |
| | | OATS | | | |
| 0 | | 30 | 2 | 7 | none |
| 5 | | 30 | 7 | 23 | none |
| 10 | | 30 | 11 | 37 | none |
| 20 | | 30 | 9 | 30 | none |
| 40 | | 17 | 1 | 6 | none |
| | | RED | FESCUE | | |
| 0 | 30 | | 1[b] | 3 | very good |
| 0 | | 2 | 1 | 50 | |
| 5 | | 30 | 30 | 100 | very poor |
| 10 | | 30 | 27 | 90 | very poor |
| 20 | | 30 | 28 | 93 | very poor |
| 40 | | 30 | 28 | 93 | very poor |
| | | HARD | FESCUE | | |
| 0 | 30 | | 1[b] | 3 | none |
| 0 | | 1 | 1 | 100 | |
| 5 | | 30 | 5 | 17 | none |
| 10 | | 30 | 19 | 63 | none |
| 20 | | 9 | 4 | 44 | none |
| 40 | | 30 | 19 | 63 | none |
| | | BENTGRASS | | | |
| 0 | | 30 | 30 | 100 | excellent |
| 5 | | 30 | 30 | 100 | very good |
| 10 | | 30 | 29 | 97 | very good |
| 20 | | 30 | 30 | 100 | very good |
| 40 | | 30 | 30 | 100 | very good |
| | | BAHIAGRASS | | | |
| 0 | 30 | | 0 | 0 | excellent |
| 5 | 30 | | 0 | 0 | very good |

TABLE VIII—Continued

| Treatment (lbs/A) | Number of Sprigs Sprigged[a] | | Survived | Percent Survival | Regrowth of Parent Material |
|---|---|---|---|---|---|
| | Without Nodes | With Nodes | | | |
| 10 | 30 | | 0 | 0 | very good |
| 20 | 30 | | 0 | 0 | fair |
| 40 | 24 | | 0 | 0 | very good |
| 40 | | 1 | 1 | 100 | |
| CORN | | | | | |
| 0 | | 4 | 4 | 100 | none |
| 5 | | 5 | 4 | 80 | none |
| 10 | | 4 | 4 | 100 | none |
| 20 | | 3 | 3 | 100 | none |
| 40 | | 3 | 3 | 100 | none |

[a] All of the sprigs with nodes, up to 30 nodes from each treatment were sprigged.
[b] The sprigs had a node.

As will be noted from Table VIII, none of the sprigged stems without nodes survived; once again demonstrating that stems from grasses must have nodes before they will root. For the following species, treatment with Ethrel resulted in increasing sprig production without stopping the regrowth of the parent material:

F. elatior — meadow fescue
F. elatior var. arundinacea — tall fescue
L. perenne — perennial ryegrass
S. vulgare var. sudanense — sudangrass
B. inermis — bromegrass
P. pratense — timothy
F. rubra — red fescue In the case of orchardgrass and bahiagrass, some increase in sprig production was noted, although less than that obtained with those identified above. In the case of wheat, oats and hard fescue, sprig production was increased although regrowth of parent material was poor or non-existent.

EXAMPLE 8

The following 19 growth regulators were tested to determine their capability of stimulating Kentucky bluegrass plants to produce a vegetative stem with two or more nodes, capable of rooting when sprigged into soil.

GROWTH MODIFIERS TESTED (COMMERCIAL IDENTIFICATION)

2-chloroethylphosphonic Acid (Ethrel)
N[6]-Benzyladenine (N-6)
Gibberellic Acid (Gibb)
2,4-Dichlorophenoxyacetic Acid (2,4-D)
Ethyl Propylphosphonate (NIA-10637)
3,6-Endoxohexahydrophthalic Acid (Endothal)
2,3,5-Triiodobenzoic Acid (TIBA)
(2-Chloroethyl)-Trimethylammonium Chloride (CCC)
N-Dimethylamino Succinamic Acid (B-Nine or Alar)
2,4-Dichlorobenzyl-Tributylammonium Chloride (Phosfon-S)
1-Naphthaleneacetamide
1-Naphthaleneacetic Acid (NAA)
3-Indolebutyric Acid (IBA)
1,2-Dihydo-3,6-Pyridazinedione (MH-30)
Sodium 1-(p-Chlorophenyl)-1,2-Dihydro-4,6-Dimethyl-2-Oxonicotinate (RH-531)
Methyl 2-Chloro-9-Hydroxyfluorene-9-Carboxylate (Maintain CF 125)
N-Dimethyl Morpholinium Chloride (BAS-0660)
N-Pyrrolidino-Succinamic Acid (UNI-F529)
Cycloheximide Windsor seed was seeded into soil in 56 × 56 mm pots on March 1 and allowed to germinate in the greenhouse. On May 1, the growth modifiers listed above were used to treat the established Windsor turf at 0, 4, 8, 16, 32 and 64 lbs/A. All of the pots were clipped at a height of two inches on June 26, and again on the day that the sprigs were harvested. From June 27, to July 14, the plots were clipped at the soil surface and sprigged into soil as indicated in Table IX. The number of sprigs surviving was determined four weeks after sprigging. All of the sprigs with nodes — up to 30 nodes — were sprigged. On August 21, the parent material was rated for regrowth.

TABLE IX

| Treatment (lbs/A) | Nodes Stem (Maximum) | Stems with Nodes (%) | Number of Sprigs Sprigged | | Survived | Percent Survival | Regrowth of Parent Material |
|---|---|---|---|---|---|---|---|
| | | | Without Nodes | With Nodes | | | |
| | Ethrel | | | | | | |
| 4 | 3 | 96 | | 30 | 30 | 100 | good |
| 8 | 4 | 98 | | 30 | 28 | 93 | fair |
| 16 | 4 | 100 | | 30 | 30 | 100 | fair |
| 32 | 6 | 100 | | 30 | 29 | 97 | poor |
| 64 | 10 | 100 | | 30 | 24 | 80 | poor |
| | N-6 | | | | | | |
| 0 | 0 | 0 | 30 | | 1 | 3 | excellent |
| 4 | 1 | 38 | | 30 | 28 | 93 | good |
| 8 | 1 | 28 | | 29 | 26 | 90 | fair |
| 16 | 1 | 14 | | 3 | 3 | 100 | none |
| 32 | 1 | 26 | | 16 | 15 | 94 | very poor |
| 64 | — | — | | — | — | — | none |

TABLE IX—Continued

| Treatment (lbs/A) | Nodes/Stem (Maximum) | Stems with Nodes (%) | Number of Sprigs Sprigged Without Nodes | Number of Sprigs Sprigged With Nodes | Survived | Percent Survival | Regrowth of Parent Material |
|---|---|---|---|---|---|---|---|
| | Gibb | | | | | | |
| 4 | 1 | 13 | | 18 | 17 | 94 | good |
| 8 | 2 | 74 | | 30 | 28 | 93 | very poor |
| 16 | 2 | 85 | | 30 | 26 | 87 | very poor |
| 32 | 2 | 81 | | 30 | 26 | 87 | very poor |
| 64 | 3 | 97 | | 30 | 24 | 80 | very poor |
| | 2,4-D | | | | | | |
| 0 | 0 | 0 | 30 | | 0 | 0 | excellent |
| 4 | 1 | 68 | | 30 | 27 | 90 | poor |
| 8 | 1 | 35 | | 7 | 6 | 86 | none |
| 16 | — | — | | 0 | — | — | none |
| 32 | — | — | | 0 | — | — | none |
| 64 | — | — | | 0 | — | — | none |
| | NIA-10637 | | | | | | |
| 4 | 0 | 0 | 30 | | 1 | 3 | excellent |
| 8 | 0 | 0 | 30 | | 3 | 10 | excellent |
| 16 | 0 | 0 | 30 | | 0 | 0 | excellent |
| 32 | 1 | 7 | | 8 | 8 | 100 | excellent |
| 64 | 1 | 3 | | 2 | 2 | 100 | very good |
| | Endothal | | | | | | |
| 0 | 1 | 2 | 30 | | 0 | 0 | excellent |
| 0 | | | | 2 | 2 | 100 | |
| 4 | 2 | 57 | | 30 | 28 | 93 | good |
| 8 | 1 | 25 | | 14 | 11 | 79 | good |
| 16 | 1 | 31 | | 22 | 18 | 82 | good |
| 32 | 1 | 16 | | 7 | 6 | 86 | very poor |
| 64 | 0 | 0 | | 0 | — | — | none |
| | TIBA | | | | | | |
| 0 | 1 | 27 | 30 | | 0 | 0 | very good |
| 0 | | | | 29 | 26 | 90 | |
| 4 | 1 | 4 | | 8 | 6 | 75 | excellent |
| 8 | 1 | 15 | | 19 | 11 | 58 | good |
| 16 | 1 | 8 | | 11 | 9 | 82 | good |
| 32 | 1 | 20 | | 13 | 6 | 46 | none |
| 64 | 0 | 0 | | 0 | — | — | none |
| | CCC | | | | | | |
| 4 | 1 | 6 | | 7 | 7 | 100 | excellent |
| 8 | 1 | 16 | | 24 | 21 | 88 | very good |
| 16 | 1 | 2 | | 4 | 4 | 100 | very good |
| 32 | 1 | 6 | | 8 | 7 | 88 | very good |
| 64 | 0 | 0 | | 0 | — | — | very good |
| | B - Nine | | | | | | |
| 0 | 1 | 4 | 30 | | 1 | 3 | very good |
| 0 | | | | 3 | 3 | 100 | |
| 4 | 1 | 36 | | 30 | 28 | 93 | fair |
| 8 | 1 | 54 | | 30 | 27 | 90 | poor |
| 16 | 1 | 28 | | 30 | 21 | 70 | fair |
| 32 | 1 | 26 | | 30 | 22 | 73 | fair |
| 64 | 1 | 2 | | 2 | 1 | 50 | very good |
| | Phosphon S | | | | | | |
| 4 | 1 | 7 | | 7 | 4 | 57 | poor |
| 8 | 1 | 47 | | 30 | 26 | 87 | very poor |
| 16 | 1 | 4 | | 5 | 3 | 60 | fair |
| 32 | 1 | 5 | | 6 | 6 | 100 | poor |
| 64 | 1 | 53 | | 30 | 22 | 73 | none |
| | 1-Naphthaleneacetamide | | | | | | |
| 0 | 1 | 32 | 30 | | 4 | 13 | fair |
| 0 | | | | 30 | 24 | 80 | |
| 4 | 1 | 20 | | 30 | 22 | 73 | poor |
| 8 | 1 | 21 | | 30 | 20 | 67 | fair |
| 16 | 1 | 38 | | 30 | 26 | 87 | fair |
| 32 | 2 | 58 | | 30 | 25 | 83 | poor |
| 64 | 2 | 84 | | 30 | 25 | 83 | none |
| | NAA | | | | | | |
| 4 | 1 | 47 | | 30 | 28 | 93 | poor |
| 8 | 1 | 57 | | 30 | 26 | 87 | poor |
| 16 | 1 | 15 | | 24 | 22 | 92 | good |
| 32 | 1 | 71 | | 30 | 25 | 83 | very poor |
| 64 | — | — | | 0 | — | — | none |
| | IBA | | | | | | |
| 0 | 1 | 3 | | | | | |
| 4 | 1 | 49 | | 30 | 28 | 93 | poor |
| 8 | 1 | 33 | | 30 | 25 | 83 | poor |
| 16 | 1 | 3 | | 5 | 5 | 100 | good |
| 32 | 1 | 55 | | 30 | 30 | 100 | fair |
| 64 | 1 | 40 | | 30 | 26 | 87 | fair |

TABLE IX—Continued

| Treatment (lbs/A) | Nodes Stem (Maximum) | Stems with Nodes (%) | Number of Sprigs Sprigged Without Nodes | Number of Sprigs Sprigged With Nodes | Survived | Percent Survival | Regrowth of Parent Material |
|---|---|---|---|---|---|---|---|
| | MH-30 | | | | | | |
| 4 | 1 | 27 | | 30 | 25 | 83 | poor |
| 8 | 1 | 15 | | 29 | 18 | 62 | poor |
| 16 | 1 | 24 | | 28 | 13 | 46 | very poor |
| 32 | 1 | 7 | | 7 | 4 | 57 | very poor |
| 64 | — | — | | 0 | — | | none |
| | RH-531 | | | | | | |
| 0 | 0 | 0 | 30 | | 0 | 0 | poor |
| 4 | 0 | 0 | 30 | | 0 | 0 | poor |
| 8 | 1 | 6 | | 6 | 6 | 100 | very poor |
| 16 | 1 | 2 | | 2 | 1 | 50 | very poor |
| 32 | 1 | 8 | | 9 | 7 | 78 | very poor |
| 64 | 1 | 12 | | 7 | 5 | 71 | none |
| | CF-125 | | | | | | |
| 4 | 1 | 11 | | 7 | 6 | 86 | good |
| 8 | 1 | 19 | | 20 | 13 | 65 | good |
| 16 | 1 | 8 | | 7 | 7 | 100 | good |
| 32 | 1 | 50 | | 7 | 3 | 43 | none |
| 64 | — | — | | 0 | — | — | none |
| | UNI-F 529 | | | | | | |
| 0 | 1 | 7 | 30 | | 0 | 0 | good |
| 0 | | | | 9 | 9 | 100 | |
| 4 | 1 | 36 | | 26 | 24 | 92 | good |
| 8 | 1 | 4 | | 4 | 4 | 100 | excellent |
| 16 | 1 | 1 | | 1 | 1 | 100 | very good |
| 32 | 1 | 39 | | 30 | 20 | 67 | very good |
| 64 | 1 | 24 | | 30 | 28 | 93 | good |
| | BAS-0660 | | | | | | |
| 4 | 1 | 25 | | 16 | 14 | 88 | good |
| 8 | 1 | 14 | | 27 | 20 | 74 | very good |
| 16 | 1 | 11 | | 12 | 10 | 83 | excellent |
| 32 | 1 | 1 | | 2 | 2 | 100 | very good |
| 64 | 1 | 4 | | 6 | 5 | 83 | very good |
| | Cycloheximide | | | | | | |
| 0 | 1 | 24 | 30 | | 2 | 7 | poor |
| 0 | | | | 29 | 27 | 93 | |
| 4 | 1 | 7 | | 11 | 9 | 82 | good |
| 8 | 1 | 66 | | 30 | 23 | 77 | fair |
| 16 | 1 | 58 | | 30 | 30 | 100 | poor |
| 32 | 1 | 6 | | 1 | 1 | 100 | very poor |
| 64 | 1 | 50 | | 2 | 0 | 0 | none |

In the results set forth in Table IX, it will be noted that some of the control pots contained a large percentage of stems with a node. The reason for this is that young seedlings instead of mature turf was used in Example 8. With young seedlings there is not a thatch buildup as in a mature sod. Thus sometimes the plants were clipped a few millimeters below the soil surface instead of at or slightly above the soil surface, with the result that the top node in the crown, rather than an aerial node, was sprigged into the soil. For the examples in which mature sod or corks in jars is used, a stem with a node is sufficient evidence of sprig formation; however, for Example 8, it was necessary to require that the clipped stems have at least two nodes.

In Table IX, the percent stems with nodes along with the maximum number of nodes per stem are given. Ethrel treated Windsor yielded sprigs with a maximum number of nodes ranging from 3 to 10 according to the rate of Ethrel used and with 96 to 100 percent of the stems with nodes. At a rate of 8 lbs/A, Ethrel stimulated 98 percent of the stems to produce nodes with these stems containing up to four nodes per stem. This rate of sprig production as well as this maximum number of nodes per stem was higher than for any other growth regulator tested.

Gibberellic acid at 8 lbs/A stimulated 74 percent of the stems to produce up to two nodes per stem and at 64 lbs/A it stimulated 97 percent of the stems to produce up to three aerial nodes per stem. Except for Ethrel, this stimulation of sprig production by gibberellic acid was better than any of the other growth modifiers tested. Of the other growth modifiers tested, only 1-naphthaleneacetamide and Endothal stimulated Windsor plants to produce sprigs with up to two nodes per stem. Windsor treated with 64 lbs/A of 1-naphthaleneacetamide had 84% of the stems with nodes. Treatment with 4 lbs/A of Endothal resulted in 57 percent of the stems with nodes.

The percent survival of the sprigged stems and the regrowth of the parent material are recorded in Table IX. The sprigs harvested from plants treated with Ethrel, gibberellic acid, Endothal and 1-naphthaleneacetamide, all had 80 percent or better survival. Also the parent material treated with these four growth regulators had regrowth. Accordingly, it will be seen that when certain grasses are treated with the appropriate growth regulators, they are stimulated to produce vegetative stems with nodes which will root when sprigged into soil and that the parent material will regrow.

The foregoing is a description of illustrative embodiments of the invention, and it is applicant's intention in the appended claims to cover all forms which fall within the scope of the invention.

I claim:

1. A process for vegetatively reproducing non-stoloniferous grass capable of stimulation to produce aerial nodes in the vegetative stem thereof comprising treating said grass with a growth regulator in amounts ranging from 1-64 pounds per acre, to produce aerial nodes in the stem by internode elongation in the crown of said grass, clipping at least one of said nodes from said stem, and sprigging said clipping into a growing medium.

2. The process of claim 1 in which the growth regulator is selected from the group consisting of 2-chloroethylphosphonic acid and its ethylene-producing derivatives, ethylene, gibberellic acid, 3,6-endoxohexahydrophthalic acid, 1-naphthaleneacetamide and mixtures thereof.

3. The process of claim 1 in which the grass is selected from the group consisting of Kentucky bluegrass, meadow fescue, tall fescue, perennial ryegrass, sudangrass, bromegrass, timothy, red fescue, bahiagrass and orchardgrass.

4. The process of claim 2 in which the growth regulator is 2-chloroethylphosphonic acid.

5. The process of claim 3 in which the grass is Kentucky bluegrass.

6. The process of claim 2 in which the growth regulator is gibberellic acid.

7. The process of claim 2 in which the growth regulator is ethylene.

8. The process of claim 2 in which the growth regulator is 3,6-endoxohexahydrophthalic acid.

9. The process of claim 2 in which the growth regulator is 1-naphthaleneacetamide.

10. The process of claim 4 in which the growth regulator is applied as an aqueous solution.

11. The process of claim 4 in which the solution contains from about 80 to 135,000 parts of growth regulator per million parts of water.

12. A process for vegetatively reproducing Kentucky bluegrass from vegetative stems comprising treating a first area of said bluegrass with a growth regulator selected from the group consisting of 2-chloroethylphosphonic acid, its ethylene-producing derivatives and mixtures thereof to produce aerial nodes in said stems by internode elongation between successive nodes in the crown of said grass, clipping at least one of said nodes from said stems and sprigging said clipping into a second area of soil, said regulator being applied in an amount sufficient to stimulate the production of aerial nodes, but insufficient to kill said first area of bluegrass.

13. The process of claim 12 in which the growth regulator is 2-chloroethylphosphonic acid.

14. The process of claim 12 in which the second area of soil is from five to thirty times larger than the first area of Kentucky bluegrass.

15. The process of claim 12 in which the bluegrass is treated with from 1 to 64 lbs/acre of growth regulator.

* * * * *